Oct. 3, 1944.　　　W. A. ORLOWSKY　　　2,359,706
REAR VISION DEVICE
Filed May 26, 1941

INVENTOR.
Wassyl A. Orlowsky

Patented Oct. 3, 1944

2,359,706

UNITED STATES PATENT OFFICE 2,359,706

REAR VISION DEVICE

Wassyl A. Orlowsky, New York, N. Y.

Application May 26, 1941, Serial No. 395,188

1 Claim. (Cl. 88—86)

My invention relates to a rear vision device for trucks and other vehicles.

An object of my invention is the provision of a rear vision device which will enable a truck driver to see clearly the area in the direct rear of the truck and which will facilitate the parking and the backing of trucks on crowded streets by enabling the driver to gain a view of the area adjacent the rear right wheel of the truck.

With this and other objects in view my invention will appear more clearly from the following detailed description and the appended drawing showing, by way of example only, a preferred embodiment of the inventive idea.

Figure 1:
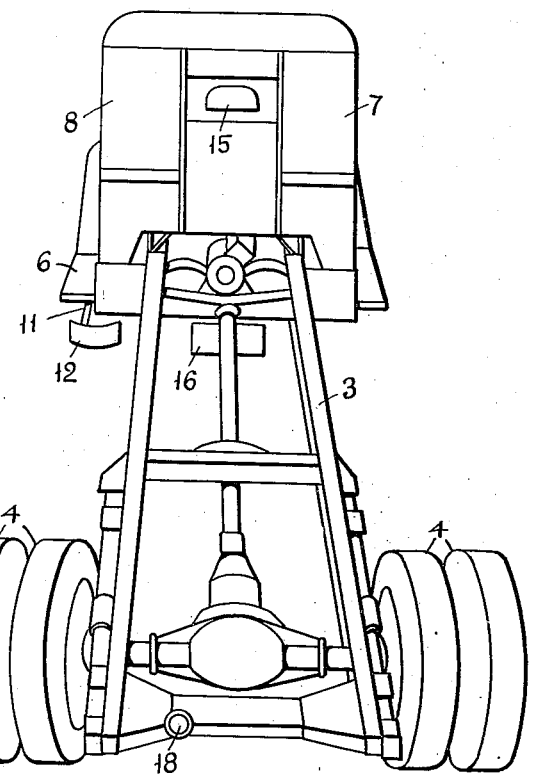

Figure 1 of the drawing is a periscopic rear view of a truck provided with a rear vision device constructed in accordance with my invention.

Figure 2:
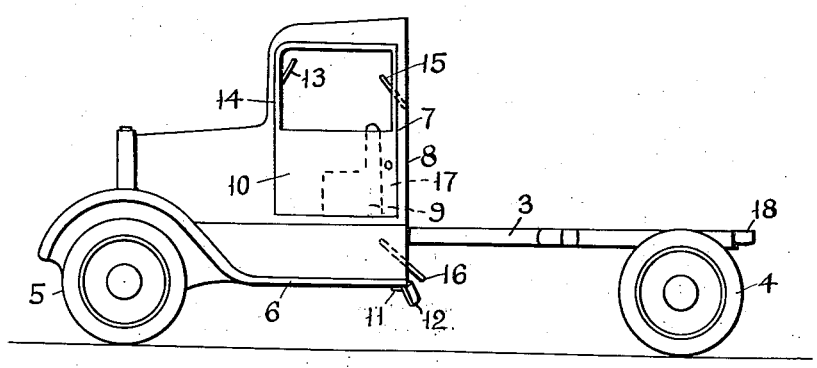

Figure 2 is a side view of the truck.

The truck shown in the drawing includes a frame 3 carried by rear wheels 4 and front wheels 5 and carrying foot boards 6 located on both sides of the driver's cab 7 which includes a rear wall 8, the driver's seat 9 and doors 10.

In accordance with the present invention, the left foot board 6 carries rods 11 which support a mirror 12. The mirror 12 is located somewhat below and behind the left foot board 6 and is directed toward the right rear wheel 4 of the truck.

The mirror 12 reflects the area around the right rear wheel 4 and is clearly visible by the driver when he opens slightly the left hand door 10 during parking or backing to the right hand curb.

There is also another mirror 13 situated above the wind shield 14 within the drivers cab 7 above the driver's seat 9. The mirror 13 reflects another mirror 15 mounted within the driver's cab 7 upon the rear wall 8 above the driver's seat 9. A mirror 16 is reflected in the mirror 15. The mirror 16 is directed toward the rear of the truck and is carried by the frame 3 between the longitudinal beams of the frame close to wall 8. A space 17 may be provided between the rear wall 8 and the driver's seat 9 for the passage of light rays from the mirror 16 to the mirror 15.

An electric lamp 18 may be mounted upon the rear end of the frame 3 and connected to the truck battery. The lamp 18 may be operated by a switch (not shown) from the dash board and it will provide illumination for the area to the rear of the truck, which is reflected in the mirrors 12 and 16.

Some parts of my rear vision device may be used independently of other parts and in general various modifications may be made in the described device without departing from the spirit of the invention.

I claim:

In combination with a vehicle having a frame and a driver's seat; a rear vision device, comprising two mirrors mounted in the front of the frame, one of said mirrors being directed directly toward the rear of the frame, the other mirror being directed diagonally across the frame and toward the rear thereof, one of said mirrors being visible from the driver's seat, and means visible from the driver's seat and reflecting the other one of said mirrors.

WASSYL A. ORLOWSKY.